US012696999B2

(12) United States Patent
Chupka

(10) Patent No.: US 12,696,999 B2
(45) Date of Patent: Aug. 4, 2026

(54) DRIVETRAIN FOR A MIXER WITH REDUCED OPERATING NOISE

(71) Applicant: Haier US Appliance Solutions, Inc., Wilmington, DE (US)

(72) Inventor: Edward Simeon Chupka, Bardstown, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 443 days.

(21) Appl. No.: 18/456,933

(22) Filed: Aug. 28, 2023

(65) Prior Publication Data

US 2024/0225365 A1     Jul. 11, 2024

Related U.S. Application Data

(60) Provisional application No. 63/437,318, filed on Jan. 5, 2023.

(51) Int. Cl.
| | |
|---|---|
| *A47J 43/00* | (2006.01) |
| *A47J 43/08* | (2006.01) |
| *F16H 1/28* | (2006.01) |
| *F16H 57/00* | (2012.01) |

(52) U.S. Cl.
CPC .............. *A47J 43/082* (2013.01); *F16H 1/28* (2013.01); *F16H 2057/0056* (2013.01)

(58) Field of Classification Search
CPC . A47J 43/082; A47J 43/08; F16H 1/28; F16H 2057/0056; F16H 57/00
See application file for complete search history.

(56) References Cited

U.S. PATENT DOCUMENTS

| | | | |
|---|---|---|---|
| 3,737,000 A | 6/1973 | Knoblock |
| 6,761,477 B2 | 7/2004 | Martin |
| 6,824,303 B2 | 11/2004 | Huang |
| 7,207,711 B2 | 4/2007 | Bader |
| 7,387,430 B2 | 6/2008 | Bader |
| 7,540,653 B2 | 6/2009 | Brinkman |
| 7,614,779 B2 | 11/2009 | Ta |
| 8,313,233 B2 | 11/2012 | Kovacic |
| 8,485,058 B2 | 7/2013 | Kovacic |
| 9,167,938 B2 | 10/2015 | Benoit |
| 9,397,596 B2 | 7/2016 | Baker |

(Continued)

FOREIGN PATENT DOCUMENTS

| | | |
|---|---|---|
| WO | WO2007023102 A1 | 3/2007 |
| WO | WO2011144820 A1 | 11/2011 |

(Continued)

*Primary Examiner* — Anshu Bhatia
(74) *Attorney, Agent, or Firm* — Dority & Manning, P.A.

(57) ABSTRACT

A drivetrain for coupling a motor to a mixer shaft within a mixer includes a sun gear connectable to a rotor of the motor. The drivetrain also includes a plurality of stepped planetary gears. Each of the stepped planetary gears includes a first tooth section and a second tooth section. A first ring gear is mounted such that the first ring gear is fixed. The first ring gear and the sun gear are meshed with the stepped planetary gears at the first tooth section. A second ring gear is meshed with the stepped planetary gears at the second tooth section. The sun gear, the stepped planetary gears, the first ring gear, and the second ring gear collectively form a single stage planetary gear set of the drivetrain.

20 Claims, 11 Drawing Sheets

(56)     References Cited

U.S. PATENT DOCUMENTS

| | | | |
|---|---|---|---|
| 9,556,916 | B2 | 1/2017 | Conti |
| 9,982,753 | B1 | 5/2018 | Hsu |
| 10,111,558 | B2 | 10/2018 | Hardcastle |
| 10,660,476 | B2 | 5/2020 | Jin |
| 10,820,735 | B2 | 11/2020 | Benoit |
| 10,925,440 | B2 | 2/2021 | Chung |
| 2004/0121879 | A1* | 6/2004 | Schulz ................. F16H 57/082 |
| | | | 475/331 |
| 2014/0050045 | A1 | 2/2014 | Hoare |
| 2018/0128326 | A1* | 5/2018 | Lin ......................... F16D 11/14 |
| 2018/0279834 | A1* | 10/2018 | Wang ..................... A47J 27/13 |
| 2019/0282035 | A1* | 9/2019 | Jin ........................... A21C 1/02 |
| 2020/0129010 | A1 | 4/2020 | Voss |
| 2021/0000281 | A1 | 1/2021 | Benoit |
| 2023/0000290 | A1 | 1/2023 | Chupka |

FOREIGN PATENT DOCUMENTS

| | | | |
|---|---|---|---|
| WO | WO2012097671 | A1 | 7/2012 |
| WO | WO2013185677 | A1 | 12/2013 |
| WO | WO2020024568 | A1 | 2/2020 |
| WO | WO2020103907 | A1 | 5/2020 |
| WO | WO2020183217 | A1 | 9/2020 |

* cited by examiner

DRIVETRAIN FOR A MIXER WITH REDUCED OPERATING NOISE

CROSS-REFERENCE TO RELATED APPLICATION

The present application is related and claims priority to U.S. Provisional Patent Application No. 63/437,318 filed in the United States Patent & Trademark Office on Jan. 5, 2023, which is incorporated by reference in its entirety for all purposes.

FIELD OF THE INVENTION

The present disclosure relates generally to drivetrains for mixers, such as stand mixers.

BACKGROUND OF THE INVENTION

Stand mixers generally include a motor and a drivetrain for connecting the motor to a mixer shaft. The drivetrain provides a mechanical advantage between the motor and the mixer shaft. Moreover, the drivetrain may increase a torque of the motor by decreasing the rotational speed of the motor. Known drivetrains can be large and difficult to assemble and thus negatively increase production time.

BRIEF DESCRIPTION OF THE INVENTION

The present subject matter provides a single stage planetary gear set for a mixer drivetrain. The single stage planetary gear set may include a plurality of stepped planet gears. A sun gear and a first ring gear may be meshed with a first tooth section of the stepped planet gears, and a second ring gear may be meshed with second tooth section of the stepped planet gears. The single stage planetary gear set may advantageously be more compact as well be assembled more quickly and easily than a two stage or double planetary gear set. Aspects and advantages of the invention will be set forth in part in the following description, may be apparent from the description, or may be learned through practice of the invention.

In one example aspect, a stand mixer includes a base and a head pivotally mounted to the base, A motor is disposed within the head. The motor includes a housing with a machined radial surface. A mixer shaft is rotatably mounted on the head. A drivetrain couples the motor to the mixer shaft such that the mixer shaft is rotatable by the motor. A single stage planetary gear set of the drivetrain includes a sun gear connected to a rotor of the motor and a plurality of stepped planetary gears. Each of the stepped planetary gears includes a first tooth section and a second tooth section. A first ring gear is mounted to the head such that the first ring gear is fixed relative to the head. The first ring gear and the sun gear are meshed with the stepped planetary gears at the first tooth section. A second ring gear is meshed with the stepped planetary gears at the second tooth section. The first ring gear is formed with powdered metal, and a radial surface of the first ring gear faces and contacts the machined radial surface of the housing of the motor.

In another example aspect, a stand mixer includes a base and a head pivotally mounted to the base, A motor is disposed within the head. The motor includes a housing with a machined radial surface. A mixer shaft is rotatably mounted on the head. A drivetrain couples the motor to the mixer shaft such that the mixer shaft is rotatable by the motor. A single stage planetary gear set of the drivetrain includes a sun gear connected to a rotor of the motor and a plurality of stepped planetary gears. Each of the stepped planetary gears includes a first tooth section and a second tooth section. A first ring gear is mounted to the head such that the first ring gear is fixed relative to the head. The first ring gear and the sun gear are meshed with the stepped planetary gears at the second tooth section. A second ring gear is meshed with the stepped planetary gears at the first tooth section. The first ring gear is formed with powdered metal, and a radial surface of the first ring gear faces and contacts the machined radial surface of the housing of the motor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
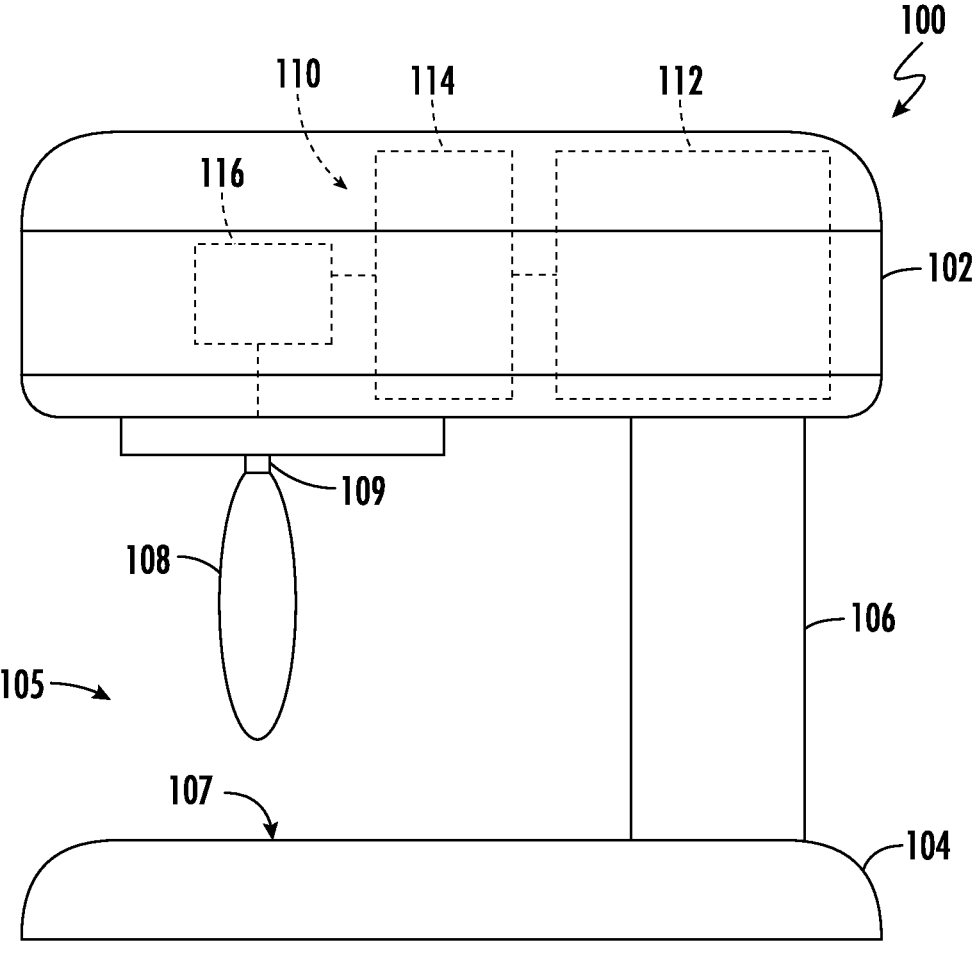
FIG. 1 provides a side, elevation view of a stand mixer according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments.

Stand mixer 100 includes a head 102 and a base 104. Head 102 houses various mechanical and/or electrical components of stand mixer 100 and thus may also be referred to herein as a casing. For example, as shown in FIG. 1, a motor 112, a planetary gear set 114, and a bevel gear set 116 may be disposed within head 102. Base 104 may support head 102. For example, head 102 may be pivotally mounted to base 104 on a post 106, e.g., that extends upwardly. Head 102 may be suspended over a mixing zone 105, within which a mixing bowl may be disposed.

A drivetrain 110 is disposed within head 102 and is configured for coupling a motor 112 to a mixer shaft 109, e.g., such that mixer shaft 109 is rotatable with motor 112 via drivetrain 110. Drivetrain 110 may include planetary gear set 114, bevel gear set 116, etc. Mixer shaft 109 may be positioned above mixing zone 105 on head 102, and an attachment 108, such as a beater, whisk, or hook, may be removably mounted to mixer shaft 109. Attachment 108 may rotate within a bowl (not shown) in mixing zone 105 to beat, whisk, kneed, etc. material within the bowl, during operation of motor 112.

Figure 2:
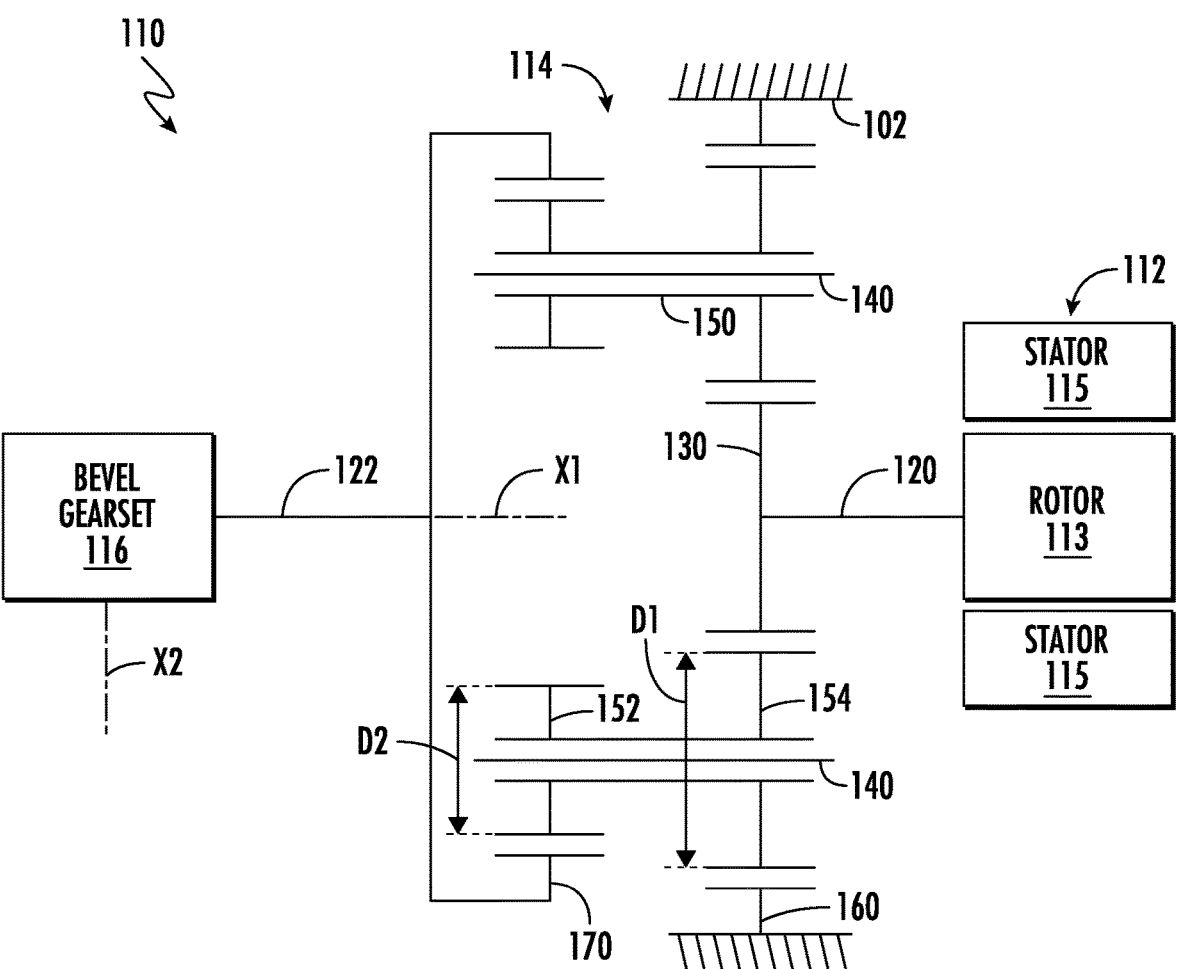
FIG. 2 is a schematic view of a drivetrain of the example stand mixer of FIG. 1.
Figure 3:
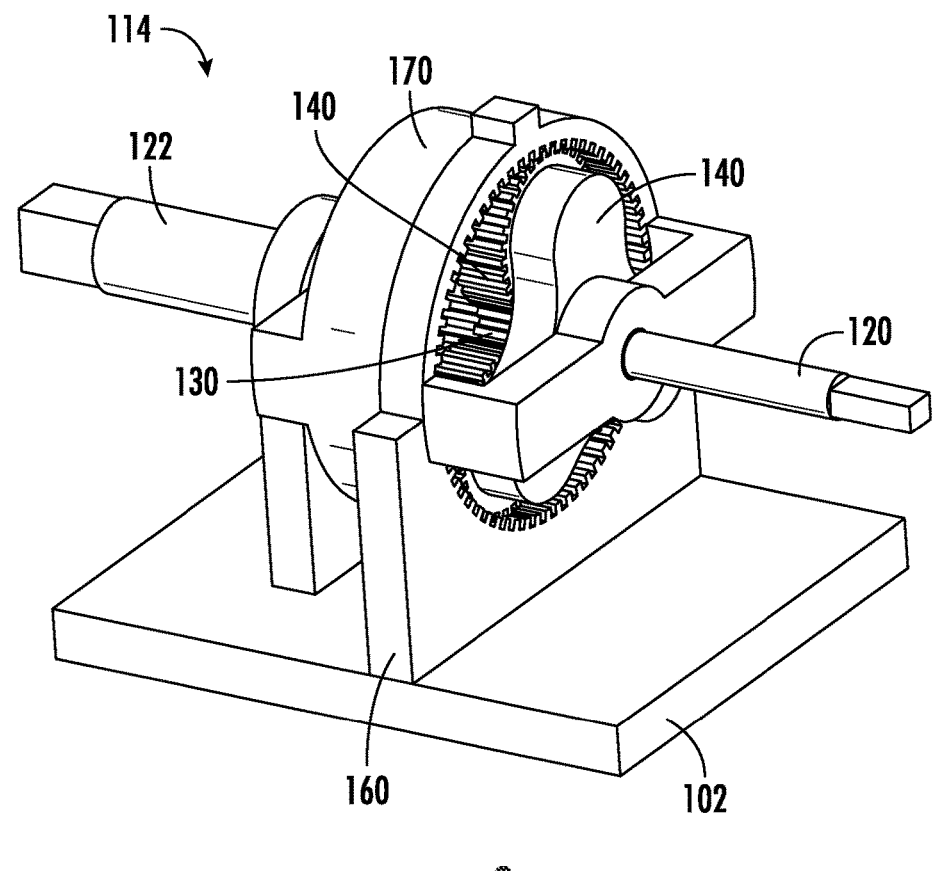
FIG. 3 is a perspective view of the drivetrain of FIG. 2.
Figure 4:
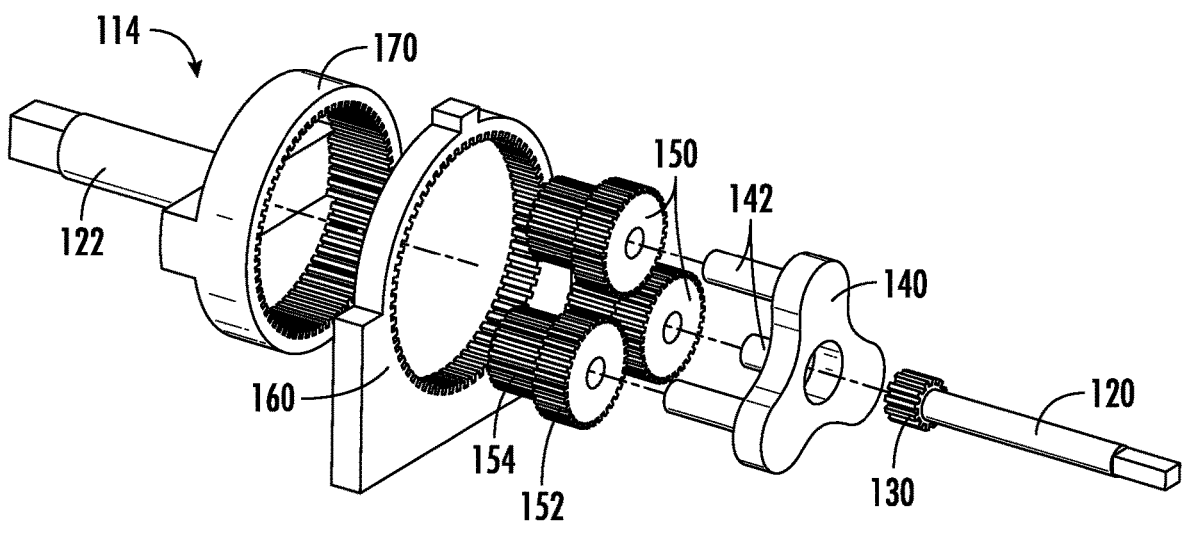
FIG. 4 is an exploded view of the drivetrain of FIG. 2.

As noted above, motor 112 may be operable to rotate mixer shaft 109. Motor 112 may be a direct current (DC) motor in certain example embodiments. In alternative example embodiments, motor 112 may be an alternating current (AC) motor. As shown in FIG. 2, motor 112 may include a rotor 113 and a stator 115. Stator 115 may be mounted within head 102 such that stator 115 is fixed relative to head 102. A current through windings within stator 115 may generate a magnetic field that induces rotation of rotor 113, e.g., due to magnets on stator 115. Stator 115 may rotate at a relatively high rotational velocity and relatively low torque. Thus, drivetrain 110 may be configured to provide a rotational speed reduction and mechanical advantage between motor 112 and mixer shaft 109.

Planetary gear set 114 may include a sun gear 130, a plurality of stepped planetary gears 150, a first ring gear 160, and a second ring gear 170. Sun gear 130, stepped planetary gears 150, first ring gear 160, and second ring gear 170 may collectively form a single stage planetary gear set, e.g., such that planetary gear set 114 has a single input and a single output. Planetary gear set 114 may provide a suitable mechanical advantage. For instance, a gear ratio of planetary gear set 114 may be between 35:1 and 80:1. As another example, the gear ratio of planetary gear set 114 may be between 50:1 and 60:1. Such gear ratios may advantageously allow motor 112 to rotate attachment 108 at suitable speeds and with suitable torques.

Sun gear 130 may be connected to rotor 113 of motor 112. For instance, an input shaft 120 of drivetrain 110 may extend between and connect rotor 113 and sun gear 130. In alternative example embodiments, one or more additional shafts may be disposed in the power flow between motor 112 and sun gear 130. Due to input shaft 120 being connected to sun gear 130, sun gear 130 may correspond to an input for planetary gear set 114.

Each of stepped planetary gears 150 may include a first tooth section 152 and a second tooth section 154. An outside diameter D1 of first tooth section 152 may be greater than an outside diameter D2 of second tooth section 154. Moreover, first tooth section 152 and second tooth section 154 may each include a different number of teeth. For instance, first tooth section 152 may have more teeth than second tooth section 154 in certain example embodiments. Thus, stepped planetary gears 150 may also be referred to compound planetary gears. To engage with stepped planetary gears 150, first and second ring gears 160, 170 may have different inside diameters. First and second tooth sections 152, 154 may be spaced axially, e.g., along an axis of rotation, on stepped planetary gears 150. First and second tooth sections 152, 154 of each stepped planetary gear 150 may be fixed and not rotatable relative to each other. Stepped planetary gears 150 may be meshed with both first and second ring gears 160, 170 at a respective one of first and second tooth sections 152, 154, as discussed in greater detail below.

Planetary gear set 114 may also include a planet carrier 140. Stepped planetary gears 150 may be rotatably mounted on planet carrier 140. For example, planet carrier 140 may include a plurality of axles 142, and each of stepped planetary gears 150 may rotatably mounted on a respective one of axles 142. Input shaft 120 may extent through planet carrier 140, e.g., such that planet carrier 140 is rotatably mounted on input shaft 120.

Sun gear 130, stepped planetary gears 150, first ring gear 160, and second ring gear 170 may be formed of suitable materials, such as plastic or metal. In particular, each of stepped planetary gears 150 may be a single, unitary piece of material, such as plastic or metal. Thus, first and second tooth sections 152, 154 may be formed of or from the single, unitary piece of material in each stepped planetary gear 150. In certain example embodiments, each of sun gear 130, stepped planetary gears 150, first ring gear 160, and second ring gear 170 may be formed from powdered metal, such as iron powder and/or copper powder, that is sintered to form the sun gear 130, stepped planetary gears 150, first ring gear 160, and/or second ring gear 170.

First ring gear 160 may be fixed and non-rotatable. Thus, first ring gear 160 may be mounted to head 102 such that first ring gear 160 is fixed relative to head 102. First ring gear 160 may be fastened, adhered, shaped, or otherwise suitably fixed to head 102. First ring gear 160 and sun gear 130 may be meshed with stepped planetary gears 150 at first tooth section 152. Thus, e.g., first tooth section 152 of each stepped planetary gear 150 may extend between first ring gear 160 and sun gear 130. The external teeth of sun gear 130 may mesh with the teeth of each stepped planetary gear 150 at first tooth section 152, and the internal teeth of first ring gear 160 may mesh with the teeth of each stepped planetary gear 150 at first tooth section 152.

Second ring gear 170 may be meshed with stepped planetary gears 150 at second tooth section 154. Thus, e.g., internal teeth of second ring gear 170 may mesh with the teeth of each stepped planetary gear 150 at second tooth section 154. Drivetrain 110 may include an output shaft 122 connected to second ring gear 170. Moreover, output shaft 122 may extend between and connect second ring gear 170 and another component of drivetrain 110, such as a bevel gear of bevel gear set 116. Due to output shaft 122 being connected to second ring gear 170, second ring gear 170 may correspond to an output for planetary gear set 114.

Figure 5:
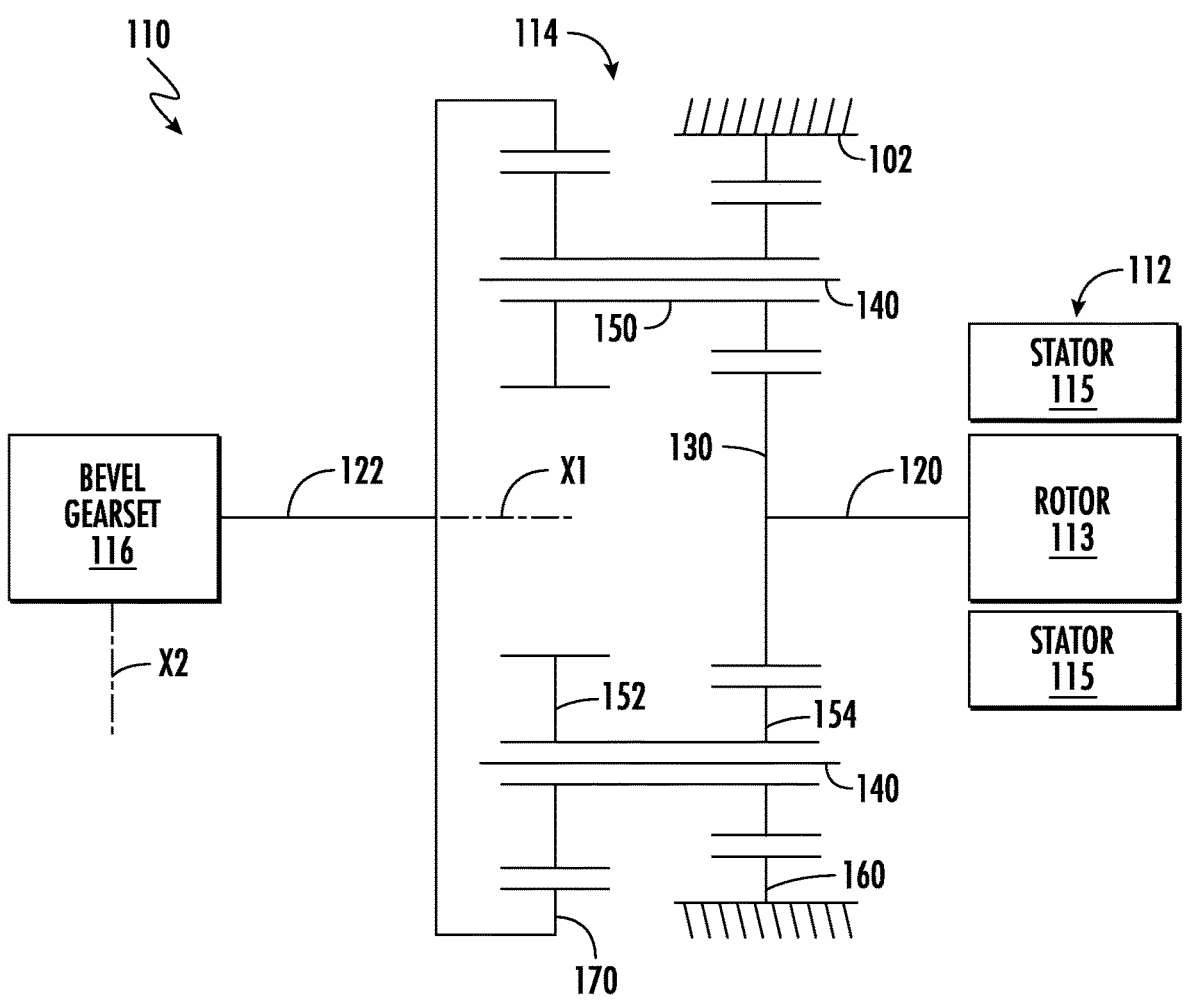
FIG. 5 is a schematic view of a drivetrain according to another example embodiment of the present subject matter.

As shown in FIG. 5, the meshing of the first and second ring gears 160, 170 with stepped planetary gears 150 may be flipped in alternative example embodiments. Thus, e.g., first ring gear 160 and sun gear 130 may be meshed with stepped planetary gears 150 at second tooth section 154, and second ring gear 170 may be meshed with stepped planetary gears 150 at second tooth section 154. It will be understood that the sizing and teething of the first ring gear 160, sun gear 130, and the stepped planetary gears 150 may be adjusted to allow such arrangement.

In another example embodiment, e.g., when the outside diameter D1 of first tooth section 152 is less than the outside diameter D2 of second tooth section 154, first ring gear 160 may be meshed with stepped planetary gears 150 at second tooth section 154, and second ring gear 170 and sun gear 130 may be meshed with stepped planetary gears 150 at first tooth section 152.

Bevel gear set 116 may include bevel gears (not shown) that changes a rotational axis of power flow within drivetrain 110. For example, as shown in FIG. 2, output shaft 122 may rotate about a first axis X1, and a first bevel gear of bevel gear set 116 may be rotate about the first axis X1. A second bevel gear of bevel gear set 116 may be meshed with the first bevel gear of bevel gear set 116, and the second bevel gear of bevel gear set 116 may rotate about a second axis X2. As an example, the first axis X1 may be substantially horizontal, and the second axis X2 may be substantially vertical when motor 112 operates to rotate attachment 108 in mixing zone 105.

By utilizing planetary gear set 114, drivetrain 110 may provide a high reduction between motor 112 and mixer shaft 109 in a compact and easy to assemble design.

Figure 6:
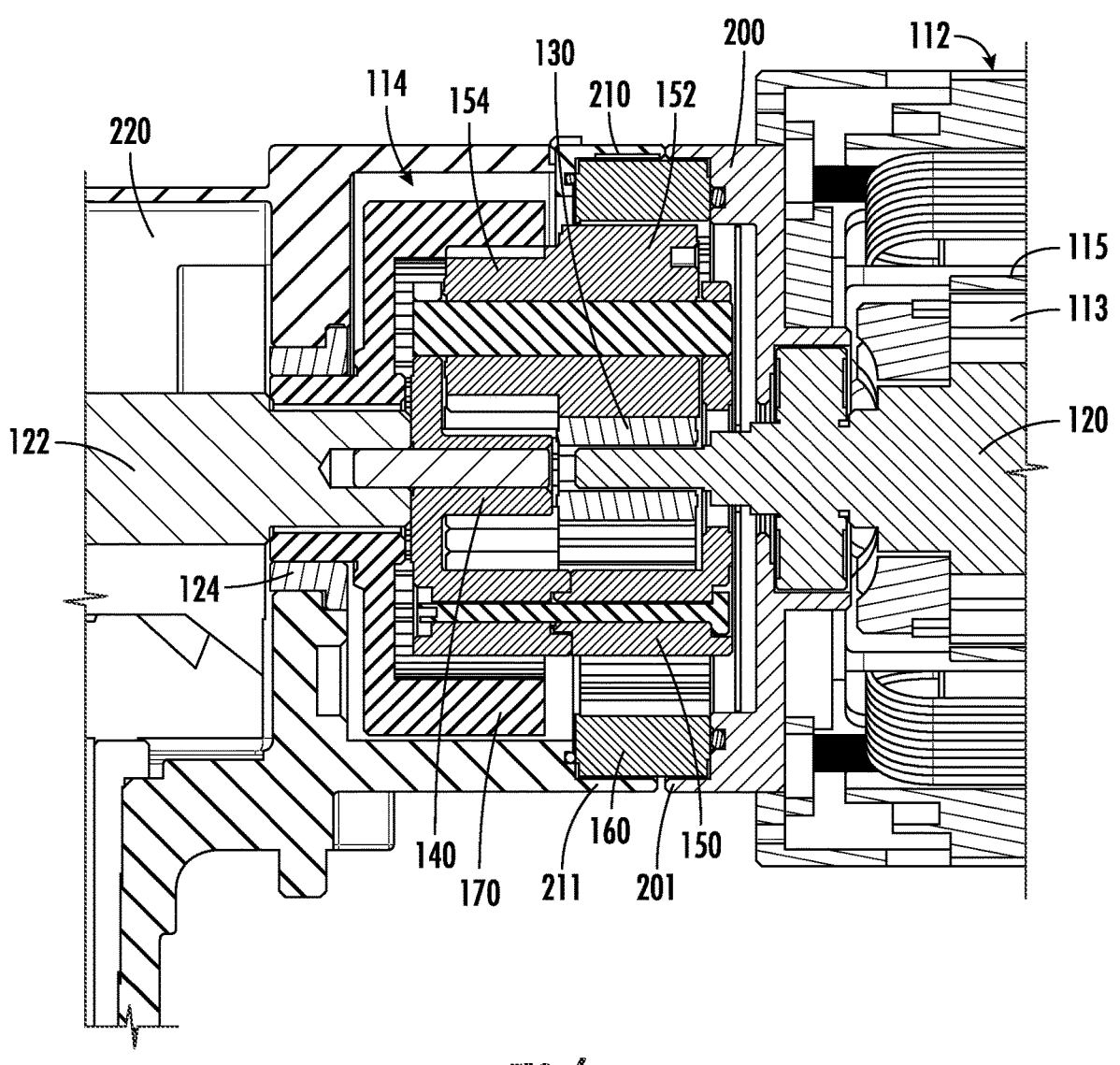
FIG. 6 is a partial, section view of the example stand mixer of FIG. 1.

Other example aspects of stand mixer 100 are described in greater detail below in the context of FIGS. 6 through 9. As noted above, first ring gear 160 may be fixed. For example, as shown in FIG. 6, motor 112 may include a housing 200, and stand mixer 100 may also include a bracket mount 210 and a bracket cover 220. First ring gear 160 may be mounted within head 102 (FIG. 1) such that first ring gear 160 is non-rotatably fixed by the housing 200 of motor 112 and/or the bracket mount 210. Utilizing the housing 200 of motor 112 and/or the bracket mount 210 to mount first ring gear 160 within head 102 may advantageously assist with tightly meshing sun gear 130 and planet gears 150. In addition, utilizing the housing 200 of motor 112 and/or the bracket mount 210 to mount first ring gear 160 within head 102 may advantageously assist with aligning the rotational axes of input shaft 120 and output shaft 122.

Figure 7:
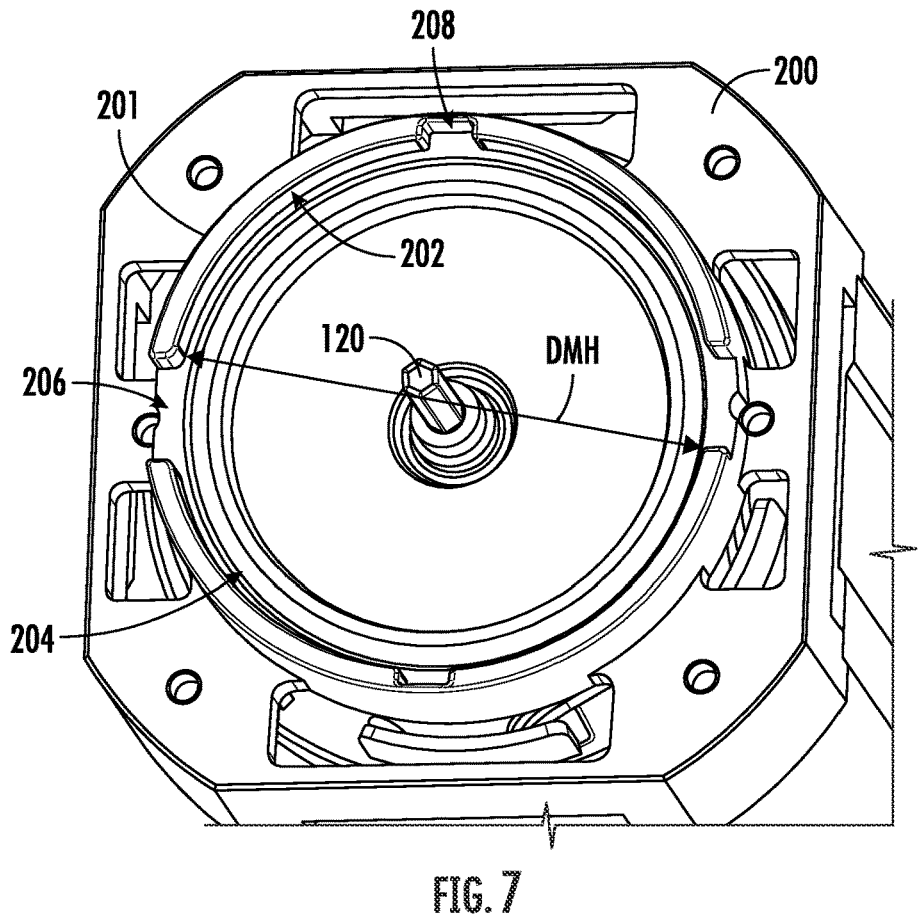
FIG. 7 is a partial, perspective view of a motor of the example stand mixer of FIG. 1.

In example embodiments, as shown in FIG. 7, housing 200 of motor 112 may be a multi-piece assembly that encloses components of motor 112, including rotor 113 and stator 115 of motor 112. Moreover, stator 115 may be fixed relative to housing 200, and housing 200 of motor 112 may be disposed within and/or fixed to head 102. As shown in FIG. 7, an end of rotor 113 and/or input shaft 120 may be disposed outside of housing 200 to allow coupling of motor 112 to drivetrain 110.

With reference to FIGS. 6 and 7, housing 200 of motor 112 may include a cylindrical support or wall 201 at an end of housing 200 adjacent planetary gear set 114. Cylindrical wall 201 may engage first ring gear 160 to assist with positioning input shaft 120 relative to sun gear 130. As an example, housing 200 of motor 112 may be constructed of or with a cast metal, such as aluminum. Portions of housing 200 at cylindrical wall 201 may be machined to facilitate mounting of first ring gear 160 to housing 200 in order to assist with accurately positioning input shaft 120 relative to sun gear 130, e.g., such that sun gear 130 and planet gears 150 are tightly meshed and thus operate quietly during operation of stand mixer 100.

In example embodiments, a radial surface 202 of housing 200 and/or an axial surface 204 of housing 200 at first ring gear 160 may be machined. For instance, a diameter DMH (FIG. 7) of the radial surface 202 may be machined to match or slightly exceed a corresponding radial surface of first ring gear 160. Thus, the diameter DMH of the radial surface 202 may be machined to match or slightly exceed a diameter DRG (FIG. 8) of a radial surface 162 of first ring gear 160.

As another example, the axial surface 204 of housing 200 may be machined flat, e.g., in plane perpendicular to an axis of rotation of the input shaft 120. The radial surface 202 of housing 200 may be defined by cylindrical wall 201 and may face radially inward towards the axis of rotation of the input shaft 120. The axial surface 204 may be defined by housing 200 radially inward of cylindrical wall 201.

Housing 200 may also define a plurality of slots 206, 208, which may extend radially outward from cylindrical wall 201. Slots 206, 208 may have different sizes. For instance, as shown in FIG. 7, slots 206 may be circumferentially wider and radially longer than slots 208. Slots 206, 208 may assist with mounting first ring gear 160 to housing 200 of motor 112, as described in greater detail below.

Figure 8:
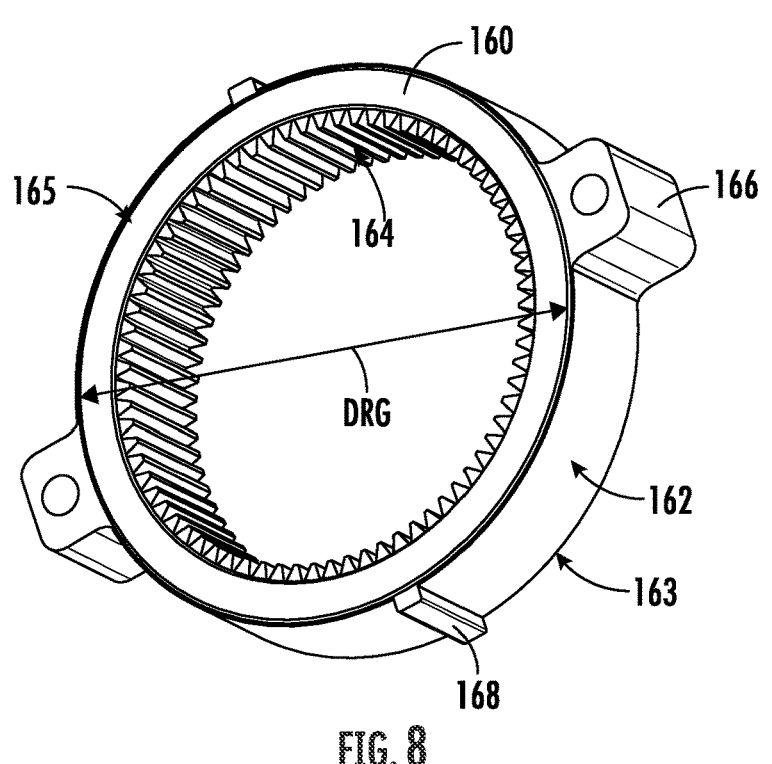
FIG. 8 is a partial, perspective view of a ring gear of the example stand mixer of FIG. 1.

Turning now to FIG. 8, first ring gear 160 may be formed with powdered metal via powder metallurgy in certain example embodiments. Thus, e.g., a powdered metal, such as iron powder, may be compacted within a die press and sintered in order to form the first ring gear 160. The powder metallurgy process is understood by those skilled in the art and not described in detail herein for the sake of brevity. In example embodiments, all of first ring gear 160 may be formed with powdered metal via powder metallurgy. In other example, embodiments, portions of first ring gear 160, such as surfaces 162, 163, may be formed with powdered metal via powder metallurgy.

It will be understood that other components of drive train 110, such as sun gear 130, stepped planetary gears 150, and second ring gear 170 may also be formed with powdered metal via powder metallurgy in certain example embodiments. Thus, e.g., a powdered metal, such as iron powder, may be compacted within a die press and sintered in order to form the sun gear 130, stepped planetary gears 150, first ring gear 160, and/or second ring gear 170.

By forming first ring gear 160 with powdered metal, a radial surface 162 of first ring gear 160, e.g., that faces radially outward and/or is not machined after the powder metal forming process, may be tightly controlled, e.g., to match the diameter DMH of the radial surface 202 after machining housing 200 of motor 112. Thus, e.g., a radial gap between first ring gear 160 and housing 200 of motor 112 may be small. In example embodiments, the fit between first ring gear 160 and housing 200 of motor 112 may correspond to a locational clearance fit, a slide fit, or a transition fit. Such tolerances between first ring gear 160 and housing 200 of motor 112 may advantageously reduce noise emitted by the interface between the first ring gear 160 and housing 200. Moreover, such tolerances between first ring gear 160 and housing 200 of motor 112 may assist with accurately positioning input shaft 120 relative to sun gear 130, e.g., such that sun gear 130 and planet gears 150 are tightly meshed and thus operate quietly during operation of stand mixer 100.

Similar tolerances and forming of an axial surface 163 of the first ring gear 160 may facilitate engagement with the axial surface 204 of the housing 200. Thus, e.g., by forming first ring gear 160 with powdered metal, the axial surface 163 of first ring gear 160, e.g., that faces axially towards motor 112 and/or is not machined after the powder metal forming process, may be tightly controlled, e.g., to match the axial surface 204 of housing 200 after machining housing 200 of motor 112. In example embodiments, both of the axial surface 163 of first ring gear 160 and the axial surface 204 of housing 200 may be flat, e.g., in a plane perpendicular to the axis of rotation of the input shaft 120.

In example embodiments, the radial surface 162 of first ring gear 160 may be, e.g., substantially, cylindrical. However, one or more portions of first ring gear 160 may project from radial surface 162 of first ring gear 160. For example, first ring gear 160 may include a plurality of lugs or projections 166, 168, which may extend radially outward from the radial surface 162 of first ring gear 160. Thus, the diameter DRG of the radial surface 162 of first ring gear 160 may be defined without regard to the one or more portions of first ring gear 160 that project from radial surface 162 of first ring gear 160, such as projections 166, 168. Moreover, the diameter DRG of the radial surface 162 of first ring gear 160 may be defined by the arcuate sections of the radial surface 162 of first ring gear 160.

Projections 166, 168 may have different sizes. For instance, as shown in FIG. 8, projections 166 may be circumferentially wider and radially longer than projections 168. Projections 166, 168 may assist with mounting first ring gear 160 to housing 200 of motor 112. Moreover, each of projections 166, 168 may be received within a respective one of slots 206, 208. For instance, projections 166 may be received within slots 206, and projections 168 may be received within slots 208. Interference between first ring gear 160 and housing 200 at the interface between projections 166, 168 and slots 206, 208 may limit or prevent rotation of first ring gear 160 relative to housing 200. Fasteners (not shown) may also extend through projections 166 to assist with mounting first ring gear 160 to housing 200 of motor 112 and/or bracket mount 210. Thus, e.g., first ring gear 160 may be clamped between housing 200 of motor 112 and bracket mount 210 in example embodiments.

In example embodiments, the diameter DMH (FIG. 7) of the radial surface 202 of the housing 200 of motor 112 may be equal to or greater than the diameter DRG (FIG. 8) of the radial surface 162 of first ring gear 160. For instance, the diameter DMH of the radial surface 202 of the housing 200 of motor 112 may be no greater than fifty-thousandths of an inch (0.050") greater than the diameter DRG of the radial surface 162 of first ring gear 160. Such sizing of the radial surfaces 162, 202 may assist with accurately positioning output shaft 120 relative to sun gear 130, e.g., such that sun gear 130 and planet gears 150 are tightly meshed and thus operate quietly during operation of stand mixer 100 and/or such that the rotational axes of input and output shafts 120, 122 are coaxial. In example embodiments, the diameter DRG (FIG. 8) of the radial surface 162 of first ring gear 160 may be no greater than three inches (3"). Such sizing may assist with positioning of first ring gear 160 within head 102 and also with formation of first ring gear 160 via powder metallurgy, e.g., by allowing efficient and/or complete sintering of the metal powder.

With reference to FIG. 6, in example embodiments, bracket mount 210 may be positioned opposite motor 112 about planetary gear set 114. Thus, planetary gear set 114 may be positioned between bracket mount 210 and motor 112 within head 102. Bracket mount 210 (e.g., with bracket cover 220) may support components of drive train 110 within head 102, such as output shaft 122, first ring gear 160, and second ring gear 170. Thus, bracket mount 210 may be disposed within and/or fixed to head 102.

Figure 9:
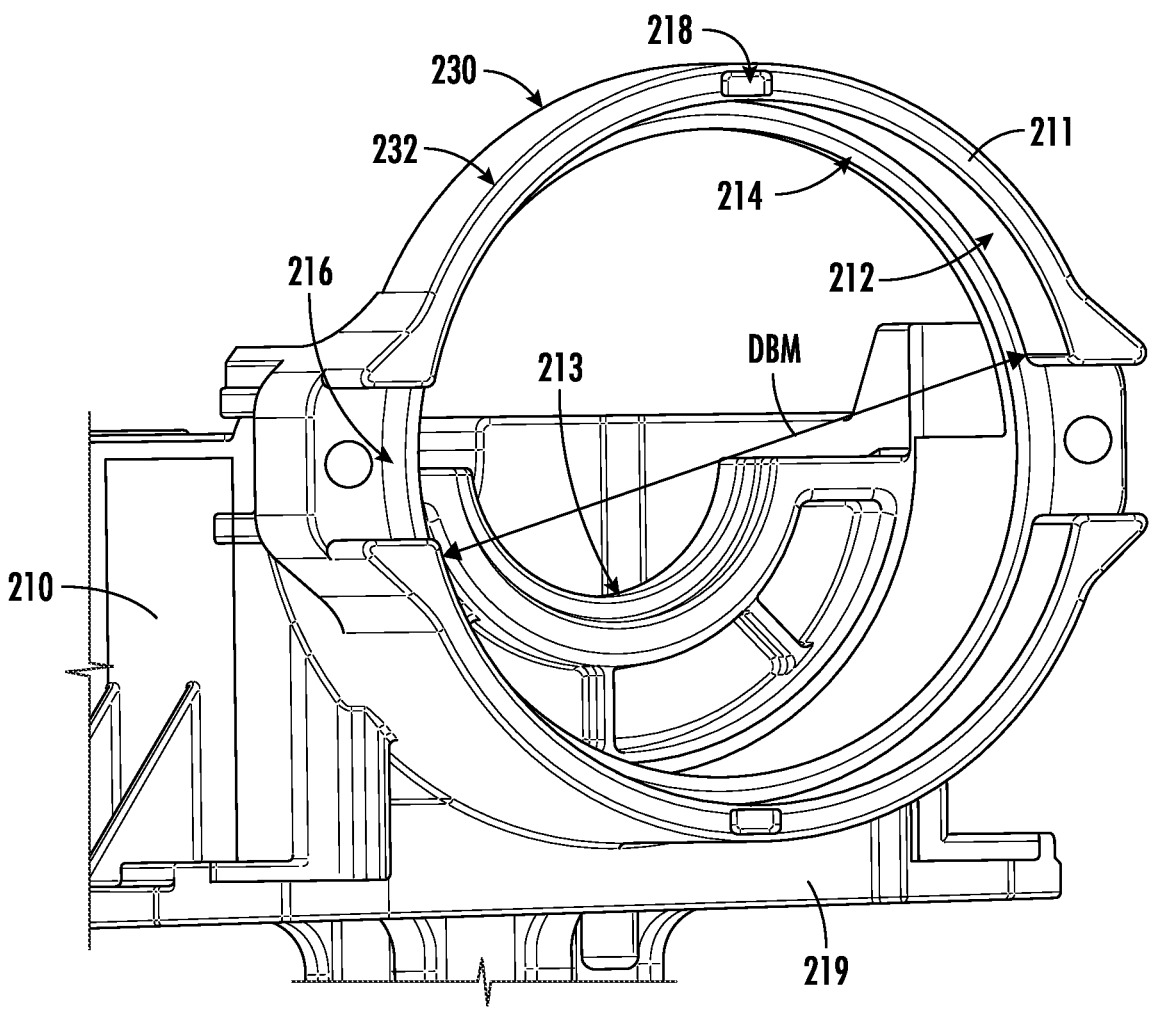
FIG. 9 is a partial, perspective view of a bearing mount of the example stand mixer of FIG. 1.

Turning now to FIG. 9, bracket mount 210 may include a cylindrical support or wall 211 at an end of bracket mount 210 adjacent planetary gear set 114 (FIG. 6). Cylindrical wall 211 may engage first ring gear 160 to assist with positioning output shaft 122 relative to sun gear 130. As an example, bracket mount 210 may be constructed of or with a cast metal, such as aluminum. In example embodiments, the casting process may provide desired tolerances for bracket mount 210 to mount ring gear 160 to bracket mount 210 in order to assist with accurately positioning output shaft 120 relative to sun gear 130, e.g., such that sun gear 130 and planet gears 150 are tightly meshed and thus operate quietly during operation of stand mixer 100 and/or such that the rotational axes of input and output shafts 120, 122 are coaxial. In other example embodiments, portions of bracket mount 210 at cylindrical wall 211 may be machined to facilitate mounting of first ring gear 160 to bracket mount 210 in order to assist with accurately positioning output shaft 120 relative to sun gear 130, e.g., such that sun gear 130 and planet gears 150 are tightly meshed and thus operate quietly during operation of stand mixer 100 and/or such that the rotational axes of input and output shafts 120, 122 are coaxial. Bracket mount 210 may include a bearing surface 213 to support a bearing 124 (FIG. 7) for output shaft 122 and second ring gear 170.

In example embodiments, a radial surface 212 of bracket mount 210 and/or an axial surface 214 of bracket mount 210 at first ring gear 160 may be cast with desired tolerances. For instance, a diameter DBM (FIG. 9) of the radial surface 212 may be cast to match or slightly exceed a corresponding radial surface of first ring gear 160. Thus, e.g., the diameter DBM of the radial surface 212 of bracket mount 210 may be equal or about equal to the diameter DRG of the radial surface 162 of first ring gear 160. As another example, the axial surface 214 of bracket mount 210 may be cast as flat, e.g., in a plane perpendicular to the axis of rotation of the output shaft 122. In other example embodiments, a radial surface 212 of bracket mount 210 and/or an axial surface 214 of bracket mount 210 at first ring gear 160 may be machined to achieve the desired dimensions. For instance, the diameter DBM of the radial surface 212 may be machined to match or slightly exceed the corresponding radial surface of first ring gear 160. As another example, the axial surface 214 of bracket mount 210 may be machined flat, e.g., in the plane perpendicular to the axis of rotation of the output shaft 122. The radial surface 212 of bracket mount 210 may be defined by cylindrical wall 211 and may face radially inward towards the axis of rotation of the output shaft 122. The axial surface 214 may be defined by bracket mount 210 radially inward of cylindrical wall 211.

In example embodiments, the diameter DBM of the radial surface 212 of bracket mount 210 may be equal to or greater than the diameter DRG of the radial surface 162 of first ring gear 160. For instance, the diameter DBM of the radial surface 212 of bracket mount 210 may be no greater than fifty-thousandths of an inch (0.050") greater than the diameter DRG of the radial surface 162 of first ring gear 160. Such sizing of the radial surfaces 162, 212 may assist with accurately positioning output shaft 120 relative to sun gear 130, e.g., such that sun gear 130 and planet gears 150 are tightly meshed and thus operate quietly during operation of stand mixer 100 and/or such that the rotational axes of input and output shafts 120, 122 are coaxial. The diameter DBM of the radial surface 212 of bracket mount 210 may also be substantially equal to the diameter DMH of the radial surface 202 of housing 20 in example embodiments.

With reference to FIGS. 6 and 9, at least a portion of the first ring gear 160 may be disposed within cylindrical wall 211. The cylindrical wall 211 of bracket mount 210 may extend axially between a first end portion 230 and a second end portion 232. The radial surface 212 of bracket mount 210 may be positioned (e.g., cast or machined) on the cylindrical wall 211 at the first end portion 230 of the cylindrical wall 211. The second end portion 232 of the cylindrical wall 211 may be positioned proximate the housing 200 of the motor 112. Moreover, second end portion 232 of the cylindrical wall 211 may be positioned adjacent with the cylindrical wall 201 housing 200, e.g., such that the distal ends of the cylindrical wall 201 housing 200 and the cylindrical wall 211 of bracket mount 210 are positioned adjacent (e.g., contact) and axially face each other. In example embodiments, the cylindrical wall 211 of bracket mount 210 may be radially spaced from the radial surface 162 of first ring gear 160 between the radial surface 212 of bracket mount 210 and the distal end of the cylindrical wall 211 of bracket mount 210.

A radial gap between first ring gear 160 and bracket mount 210 may be small. In example embodiments, the fit between first ring gear 160 and bracket mount 210 may correspond to a locational clearance fit, a slide fit, or a transition fit. Such tolerances between first ring gear 160 and bracket mount 210 may advantageously reduce noise emitted by the interface between the first ring gear 160 and bracket mount 210. Moreover, such tolerances between first ring gear 160 and bracket mount 210 may assist with accurately positioning output shaft 122 relative to sun gear 130, e.g., such that sun gear 130 and planet gears 150 are tightly meshed and thus operate quietly during operation of stand mixer 100.

Similar tolerances and forming of an axial surface 165 of the first ring gear 160 may facilitate engagement with the axial surface 214 of the bracket mount 210. Thus, e.g., by forming first ring gear 160 with powdered metal, the axial surface 163 of first ring gear 160, e.g., that faces axially towards bracket mount 110 and/or is not machined after the powder metal forming process, may be tightly controlled, e.g., to match the axial surface 214 of the bracket mount 210 provided by casting or after machining the bracket mount 210. In example embodiments, both of the axial surface 165 of first ring gear 160 and the axial surface 214 of the bracket mount 210 may be flat, e.g., in a plane perpendicular to the axis of rotation of the input shaft 120. The axial surface 165 of the first ring gear 160 that engages the axial surface 214 of the bracket mount 210 may be positioned opposite the axial surface 163 of the first ring gear 160 that engages the axial surface 204 of the housing 200 on the first ring gear 160.

Bracket mount 210 may also define a plurality of slots 216, 218, which may extend radially outward from cylindrical wall 211. Slots 216, 218 may have different sizes. For instance, as shown in FIG. 9, slots 216 may be circumferentially wider and radially longer than slots 218. Slots 216, 218 may assist with mounting first ring gear 160 to bracket mount 210. Moreover, each of projections 166, 168 may be received within a respective one of slots 216, 218. For instance, projections 166 may be received within slots 216, and projections 168 may be received within slots 218. Interference between first ring gear 160 and bracket mount 210 at the interface between projections 166, 168 and slots 216, 218 may limit or prevent rotation of first ring gear 160 relative to bracket mount 210. By engaging projections 166 with both the housing 200 of motor 112 and the bracket mount 210, first ring gear 160 may be fixed to both housing 200 and bracket mount 210.

As may be seen from the above, structural components used to support both input and output shafts 120, 122 may fix and position first ring gear 160 such that sun gear 130 and planet gears 150 are tightly meshed and/or such that the rotational axes of input shaft 120 and output shaft 122 are aligned. For instance, the rotational axes of input shaft 120 and output shaft 122 may be radially offset by no more than one-tenth of an inch (0.1") in example embodiments.

Teeth within components of planetary gear set 114 may be selected to assist efficient power transfer. For example, each of a quotient of the number of teeth for the sun gear 130 and a number of planet gears 150, a quotient of the number of teeth for the first ring gear 160 and the number of planet gears 150, and a quotient of the number of teeth for the second ring gear 170 and the number of planet gears 150 may be an integer. In addition, at least one tooth of first tooth section 152 may be axially aligned with a respective tooth of second tooth section 154. As an example, sun gear 130 may have twelve (12) teeth, first ring gear 160 may have seventy-two (72) teeth, and second ring gear 170 may have sixty-six (66) teeth, and the number of planet gears 150 may be three (3). Thus, the quotient of the number of teeth for the sun gear 130 and the number of planet gears 150 may be four (4), the quotient of the number of teeth for the first ring gear 160 and the number of planet gears 150 may be twenty-four (24), and the quotient of the number of teeth for the second ring gear 170 and the number of planet gears 150 may be twenty-two (22). It will be understood that such numbers are provided by way of example only and not intended to limit the present subject matter to the particular tooth numbers or number of planet gears described above. In addition, at least one tooth of first tooth section 152 may be axially aligned with a respective tooth of second tooth section 154.

Figure 10:
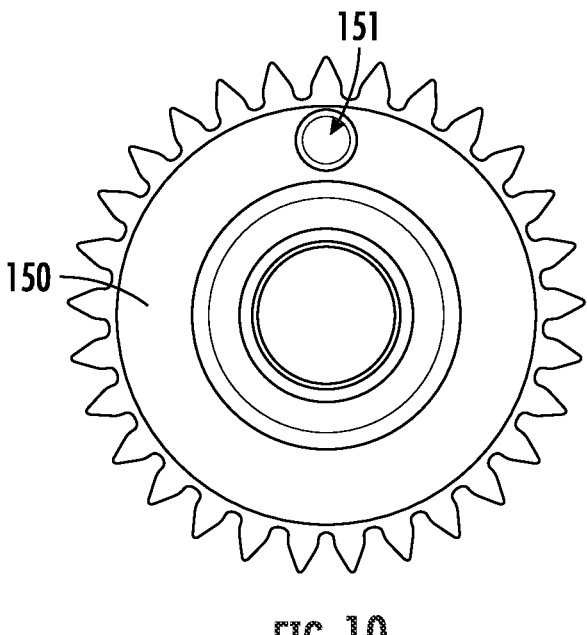
FIG. 10 is a front, elevation view of a planet gear of the example stand mixer of FIG. 1.
Figure 11:
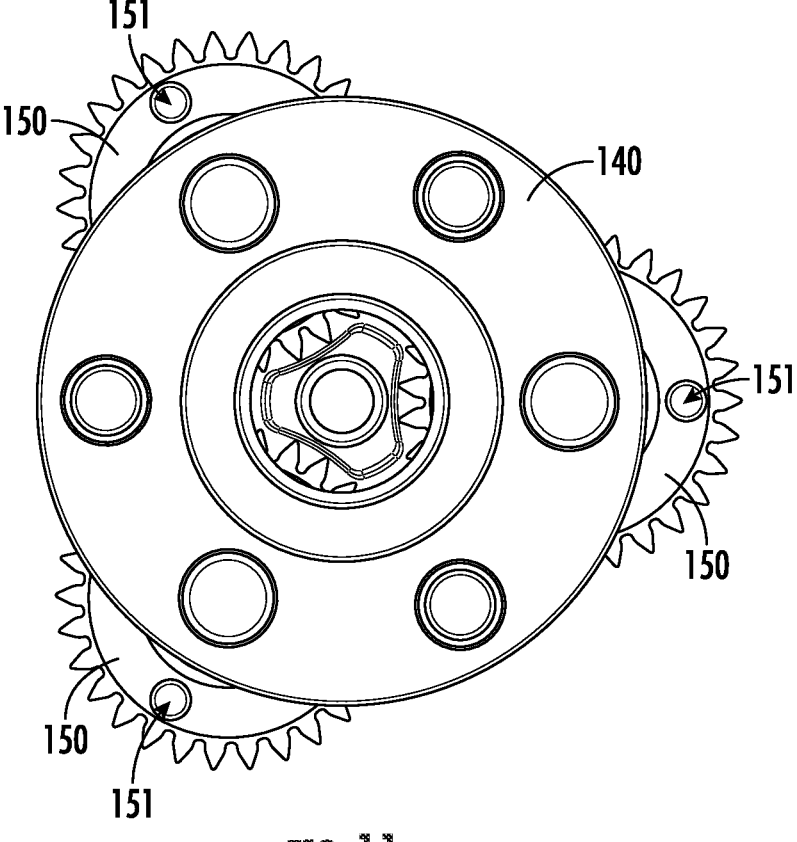
FIG. 11 is a front, elevation view of a carrier and planet gears of the example stand mixer of FIG. 1.
Figure 12:
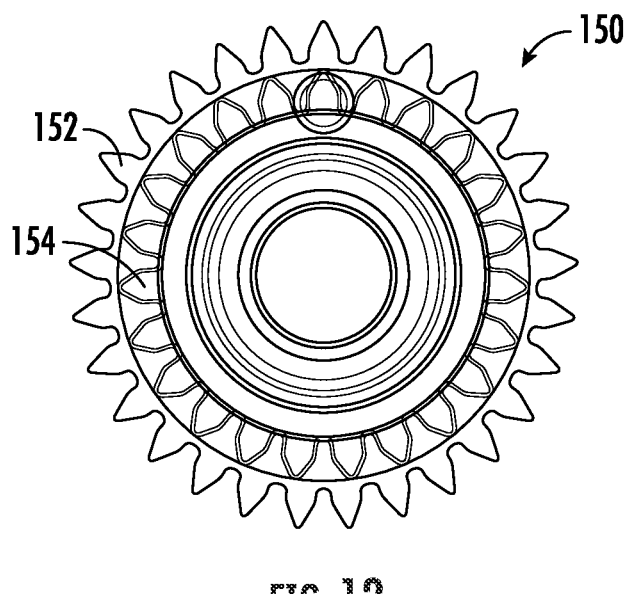
FIG. 12 is a rear, elevation view of the planet gear of FIG. 10.
Figure 13:
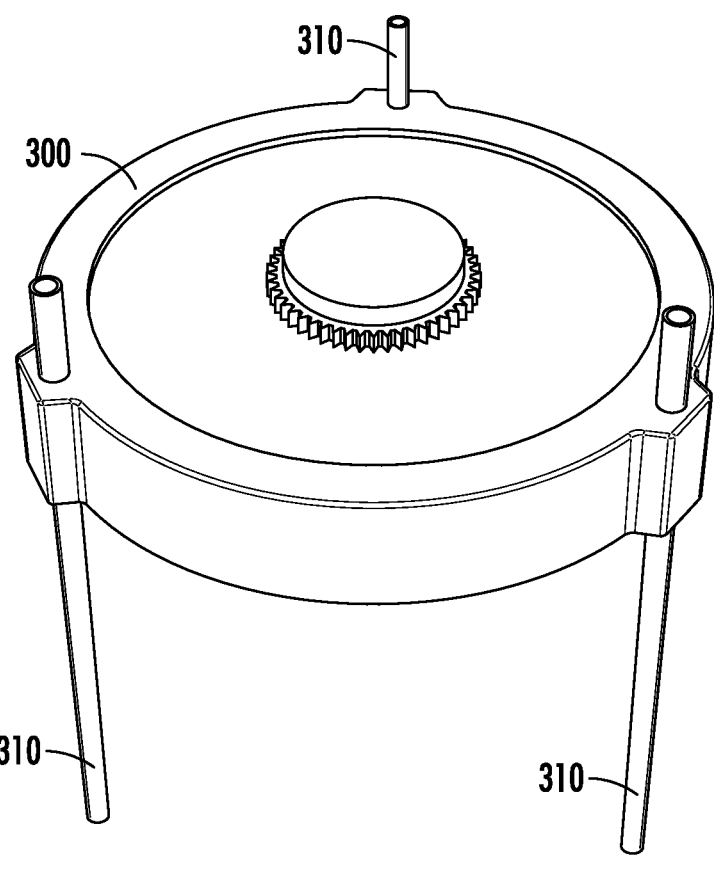
FIG. 13 is a perspective view of a fixture for the planet gears of FIG. 11 according to an example embodiment of the present subject matter.

Planetary gear set 114 may also include features for facilitating installation of planetary gear set 114 within stand mixer 100. As shown in FIG. 10, planet gears 150 may include an indicator 151, such as a hole, marking, protuberance, depression, etc. The indicator 151 may be positioned at a common location on each planet gear 150. For example, as shown in FIG. 12, one tooth of first tooth section 152 may be axially aligned with one tooth of second tooth section 154. Indicators 151 may be positioned at circumferential positions on planet gears 150 that corresponds to the aligned teeth between first and second tooth sections 152, 154. Indicators 151 may be positioned on a sidewall of planet gears 150.

Figure 14:
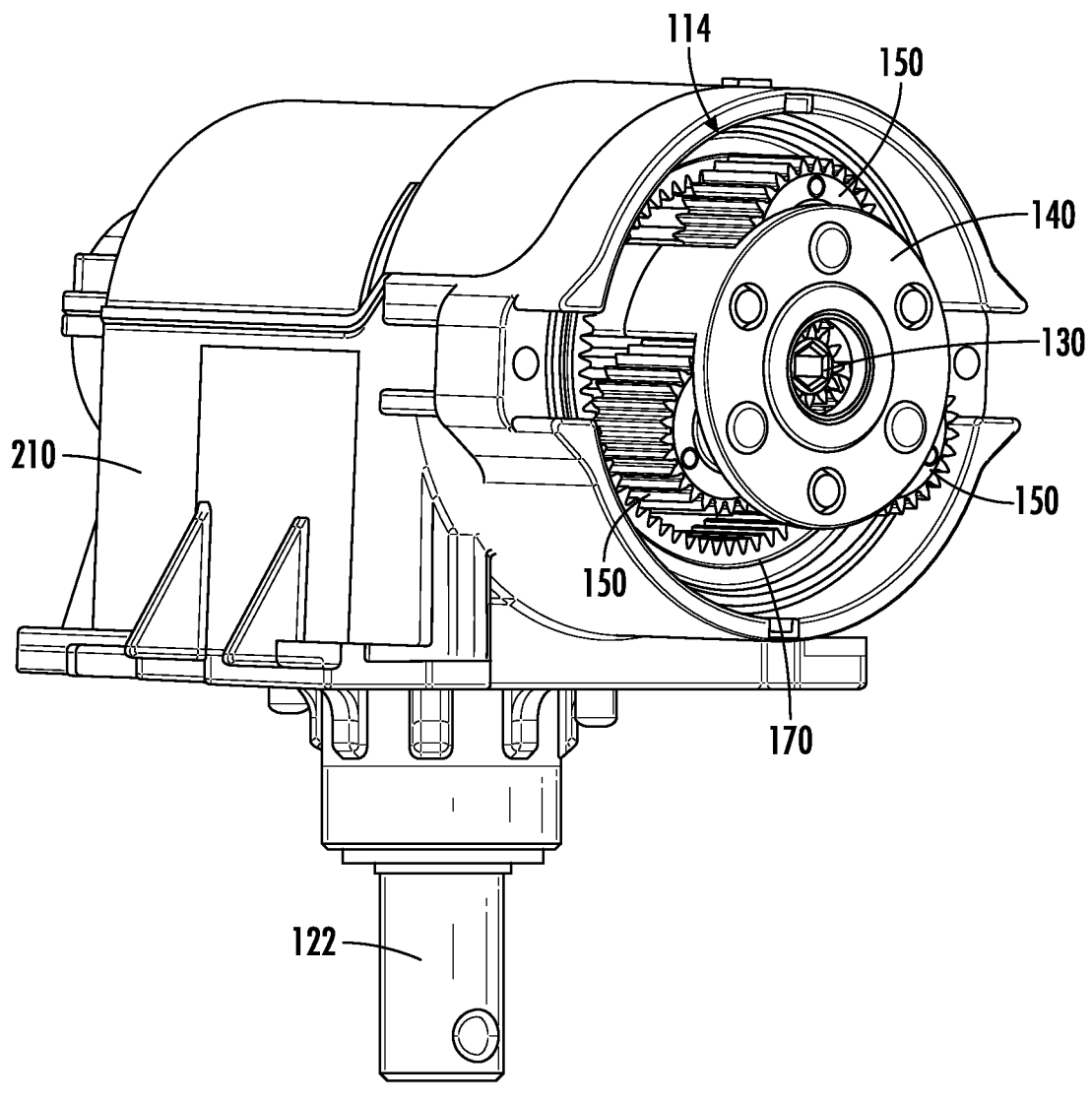
FIG. 14 is a perspective view of the carrier and planet gears of the FIG. 10 within the bearing mount of FIG. 9.
Figure 15:
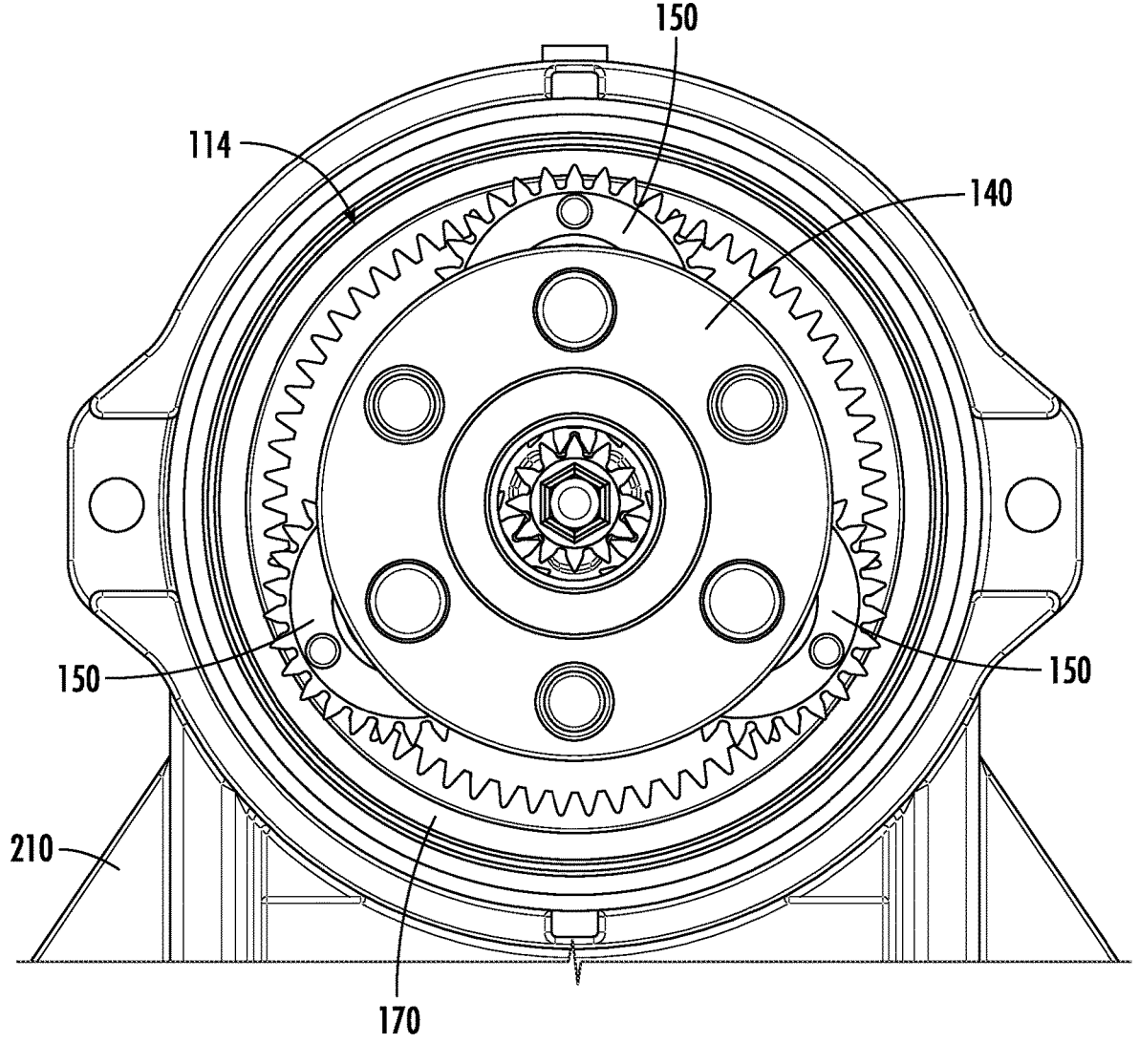
FIG. 15 is a front, elevation view of a sun gear, the carrier, and the planet gears within the bearing mount of FIG. 9.

Utilizing the indicators 151, planet gear 150 may be oriented for installation within planetary gear set 114. For example, a fixture 300 may orient each planet gear 150 by engaging indicators 151. Moreover, fixture 300 may include a plurality of fingers 310. Fingers 310 may be uniformly distributed on fixture 300 along a circumference of fixture 300. Each finger 310 may engage a respective indicator 151 in order to orient planet gears 150 to mesh with second ring gear 170. In the illustrated example embodiment, the indicators 151 are holes such that fingers 310 may be inserted into planet gears 150 at the indicators 151. Thus, as shown in FIG. 14, carrier 140 with planet gears 150 may be inserted into bracket mount 210 with indicators 151 aligned by fixture 300. Indicators 151 may assist installation of planet gears 150 in a proper alignment. Sun gear 130 may then be installed within planetary gear set 114 as shown in FIG. 15. Finally, first ring gear 160 may be installed within planetary gear set 114.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer, comprising:
a base;
a head pivotally mounted to the base;
a motor disposed within the head, the motor comprising
a housing with a machined radial surface;
a mixer shaft rotatably mounted on the head; and
a drivetrain coupling the motor to the mixer shaft such that the mixer shaft is rotatable by the motor, a single stage planetary gear set of the drivetrain comprising
a sun gear connected to a rotor of the motor,
a plurality of stepped planetary gears, each of the stepped planetary gears comprising a first tooth section and a second tooth section,
a first ring gear mounted to the head such that the first ring gear is fixed relative to the head, the first ring gear and the sun gear meshed with the stepped planetary gears at the first tooth section, and
a second ring gear meshed with the stepped planetary gears at the second tooth section,
wherein the first ring gear is formed with powdered metal, and a radial surface of the first ring gear faces and contacts the machined radial surface of the housing of the motor.

2. The stand mixer of claim 1, wherein the radial surface of the first ring gear is not machined.

3. The stand mixer of claim 1, wherein dimensions of the radial surface of the first ring gear and the machined radial surface of the housing of the motor are selected to provide a locational clearance fit, a slide fit, or a transition fit between the first ring gear and the housing of the motor.

4. The stand mixer of claim 1, wherein a diameter of the machined radial surface of the housing of the motor is equal to or greater than a diameter of the radial surface of the first ring gear, and the diameter of the machined radial surface is no more than five-thousandths of an inch of an inch greater than the diameter of the radial surface of the first ring gear.

5. The stand mixer of claim 1, wherein a diameter of the radial surface of the first ring gear is no greater than three inches.

6. The stand mixer of claim 1, wherein the plurality of stepped planetary gears are formed with powdered metal.

7. The stand mixer of claim 1, wherein the sun gear is formed with powdered metal.

8. The stand mixer of claim 1, wherein the second ring gear is formed with powdered metal.

9. The stand mixer of claim 1, wherein the powdered metal comprises iron.

10. The stand mixer of claim 1, wherein the plurality of stepped planetary gears comprises no less than three stepped planetary gears and no more than four stepped planetary gears.

11. A stand mixer, comprising:
a head disposed above a mixing zone that is configured for receipt of a mixing bowl;
a motor disposed within the head, the motor comprising a housing with a machined radial surface;
a mixer shaft rotatably mounted on the head; and
a drivetrain coupling the motor to the mixer shaft such that the mixer shaft is rotatable by the motor, a single stage planetary gear set of the drivetrain comprising
a sun gear connected to a rotor of the motor,
a plurality of stepped planetary gears, each of the stepped planetary gears comprising a first tooth section and a second tooth section,
a first ring gear mounted to the head such that the first ring gear is fixed relative to the head, the first ring gear and the sun gear meshed with the stepped planetary gears at the second tooth section, and
a second ring gear meshed with the stepped planetary gears at the first tooth section,
wherein the first ring gear is formed with powdered metal, and a radial surface of the first ring gear faces and contacts the machined radial surface of the housing of the motor.

12. The stand mixer of claim 11, wherein the radial surface of the first ring gear is not machined.

13. The stand mixer of claim 11, wherein dimensions of the radial surface of the first ring gear and the machined radial surface of the housing of the motor are selected to provide a locational clearance fit, a slide fit, or a transition fit between the first ring gear and the housing of the motor.

14. The stand mixer of claim 11, wherein a diameter of the machined radial surface of the housing of the motor is equal to or greater than a diameter of the radial surface of the first ring gear, and the diameter of the machined radial surface is no more than five-thousandths of an inch of an inch greater than the diameter of the radial surface of the first ring gear.

15. The stand mixer of claim 11, wherein a diameter of the radial surface of the first ring gear is no greater than three inches.

16. The stand mixer of claim 11, wherein the plurality of stepped planetary gears are formed with powdered metal.

17. The stand mixer of claim 11, wherein the sun gear is formed with powdered metal.

18. The stand mixer of claim 11, wherein the second ring gear is formed with powdered metal.

19. The stand mixer of claim 11, wherein the powdered metal comprises iron.

20. The stand mixer of claim 11, wherein the plurality of stepped planetary gears comprises no less than three stepped planetary gears and no more than four stepped planetary gears.

* * * * *